United States Patent [19]

Orzal

[11] Patent Number: 4,568,218

[45] Date of Patent: Feb. 4, 1986

[54] ADJUSTABLY CONTROLLABLE CENTRIFUGAL VIBRATORY EXCITER

[75] Inventor: Gregory J. Orzal, Hartford, Wis.

[73] Assignee: Wacker Corporation, Milwaukee, Wis.

[21] Appl. No.: 631,495

[22] Filed: Jul. 16, 1984

[51] Int. Cl.[4] ........................ F16H 33/00; E01C 19/38

[52] U.S. Cl. ........................................ 404/117; 74/87

[58] Field of Search ........................ 74/87, 61; 404/113, 404/114, 117, 121

[56] References Cited

U.S. PATENT DOCUMENTS

| | | | |
|---|---|---|---|
| 2,725,745 | 12/1955 | Hubbard et al. | 74/87 |
| 2,930,244 | 3/1960 | Hutchinson et al. | 74/87 |
| 4,108,009 | 8/1978 | Fuchigami | 74/61 |
| 4,356,736 | 11/1982 | Riedl | 74/87 |
| 4,389,137 | 6/1983 | Riedl | 74/87 |
| 4,481,835 | 11/1984 | Storm | 74/87 |

FOREIGN PATENT DOCUMENTS

| | | | |
|---|---|---|---|
| 313108 | 6/1929 | United Kingdom | 74/61 |
| 789063 | 1/1958 | United Kingdom | 404/117 |

*Primary Examiner*—Lawrence J. Staab
*Attorney, Agent, or Firm*—James E. Nilles

[57] ABSTRACT

A centrifugal vibratory exciter of this invention has a tubular rotatable exciter shaft on which a centrifugal mass is eccentrically fixed and in which a control shaft is axially slideably adjustable. Surrounding the exciter shaft, rotatable but not axially slideable relative to it, is a tubular counterweight carrier on which a counterweight mass is eccentrically fixed. A transverse pin carried by the control shaft projects through a slot in the exciter shaft that is elongated lengthwise of it and into a helical groove in the counterweight carrier, to translate axial adjustment of the control shaft into rotation of the counterweight carrier about the exciter shaft but to constrain the counterweight carrier to rotate with the exciter shaft in any position of axial adjustment of the control shaft. Adjusting rotation of the counterweight carrier about the exciter shaft brings the counterweight mass into phase or out of phase with the centrifugal mass, correspondingly increasing or decreasing vibratory force due to exciter shaft rotation.

3 Claims, 6 Drawing Figures

ADJUSTABLY CONTROLLABLE CENTRIFUGAL VIBRATORY EXCITER

FIELD OF THE INVENTION

This invention relates to centrifugal exciters for vibratory compactors such as are used for compacting soil and freshly laid asphalt; and the invention is more particularly concerned with a vibratory centrifugal exciter that can be adjusted while in operation for varying the centrifugal force that it develops and thus varying the vibratory force that the compactor imposes upon material being compacted.

BACKGROUND OF THE INVENTION

Soil and asphalt are compacted by applying energy to the loose material to consolidate it and remove voids, thereby increasing the density of the material and its load bearing capacity. Compaction can be effected with static force such as is exerted by the weight of a nonvibratory road roller, or by impact force such as is exerted by a tamper, or by vibratory force. In compaction machines ordinarily employed in construction work, vibratory force is usually generated by a centrifugal exciter that comprises a rotating eccentric weight. In a vibratory roller, for which the apparatus of the present invention is well suited, a centrifugal exciter is commonly supported in the interior of a roller drum to produce a vibratory action as the drum rolls over the material to be compacted.

The compaction effectivness of a vibratory roller operating upon a given type of material depends upon both the frequency and the force magnitude of the vibration that its exciter generates.

Compaction of soil is most efficiently accomplished with vibration that has both a high frequency and a high force magniture. However, after a few passes it is often desirable to employ a different combination of frequency and force than for the initial soil compaction. For compacting freshly laid asphalt aggregate, the frequency of vibration should be as high as possible, because the higher the frequency the smaller the impact ripple; but too much vibratory force displaces the material, and therefore asphalt aggregate should be initially compacted with only enough vibratory force to consolidate the mixture, the exact amount of force being dependent upon the mixture and the condition of the aggregate. With asphalt compaction, as with soil compaction, the level of force that the exciter generates should be changed after a few passes for optimum results.

Thus a centrifugal exciter for a vibratory roller should be adjustable to provide different frequencies of vibration and magnitudes of centrifugal force, so that the machine will have maximum versatility, to be capable of compacting different materials and of being operated with optimum efficiency at each stage of the compaction of any given material.

The relationship between the parameters involved in the operation of a centrifugal exciter is given by:

$$C.F.=M\cdot y\cdot w^2,$$

where

C.F. is the magnitude of centrifugal force produced by the exciter,

M is the amount of rotating eccentric mass, y is the distance from the center of gravity of the eccentric mass to the center of rotation, and w is the angular velocity of the eccentric mass.

Heretofore the expedients that have been employed for varying the magnitude of centrifugal force produced by a centrifugal exciter have all possessed marked disadvantages.

In one such exciter the eccentric mass was a liquid chamber, the effective mass of which was changed by increasing or decreasing the quantity of liquid with which the chamber was filled. To obtain a reasonably small exciter with a satisfactorily high force output, the liquid used was mercury, which is poisonous. The arrangement had the further disadvantage of being somewhat complicated and expensive.

Another prior exciter had multiple eccentric masses. One of these was fixed to the rotating exciter shaft, the other was free to rotate relative to that shaft to positions in which it was either in phase or out of phase with the eccentric mass that was fixed to the shaft, depending upon the direction of shaft rotation. This arrangement was relatively inflexible, especially in view of the fact that a centrifugal exciter for a roller compactor should always be rotated in the direction that corresponds to the direction in which the machine is being propelled.

In another prior centrifugal exciter that had multiple eccentric masses, a relatively large eccentric mass was fixed to the exciter shaft and a smaller mass was mounted on that shaft 180° out of phase with the larger one. Although constrained to rotate with the shaft, the smaller mass was carried for radially in and out movement relative to it and was spring biased radially inward to a normal position adjacent to the shaft. As rotational speed of the shaft increased, centrifugal force on the smaller mass moved it outwardly against its bias so that it increasingly cancelled a portion of the vibratory force produced by the larger mass. With this arrangement the exciter could produce only one level of centrifugal force at a given frequency. It could not be selectively operated at any desired force and frequency combination, as is necessary for optimum compacting effectiveness under all conditions.

As is evident from the relatively unsatisfactory solutions that have heretofore been accepted by the art, the problem of devising a centrifugal exciter with a flexibly adjustable centrifugal force magnitude has been of baffling complexity. Such an exciter, to be satisfactory, must be adjustable while the exciter is in operation; it should be bidirectional; it must be simple and inexpensive; and it must be inherently sturdy and reliable notwithstanding the constant and intense vibration to which all of its parts are subjected when it is in operation.

SUMMARY OF THE INVENTION

The general object of the present invention is to provide a vibratory centrifugal exciter that is particularly suitable for a roller compactor, capable of being adjusted while in operation to provide any selected one of a wide range of combinations of frequency and centrifugal force values, and satisfying the requirements for bidirectionality, simplicity, reliability, durability and low cost that are posed by such a device.

A more specific object of this invention is to provide a centrifugal vibration exciter that is adapted for installation in a drum roller of a vibratory roller compactor and is capable of being readily adjusted while it is in operation to change the magnitude of centrifugal force that it generates at any given speed of its rotary shaft.

As will be apparent from what has been said above, it is also an important general object of this invention to provide a centrifugal exciter for a compacting machine that is readily adjustable both while it is in operation and while it is at rest to provide for varying the magnitude of vibratory force substantially independently of the frequency of vibration.

In general, these and other objects of the invention that will appear as the description proceeds are achieved in the centrifugal exciter of the present invention, which is adapted for a compacting machine such as a roller compactor whereby vibratory force is imposed upon material to be compacted and which is operable to generate such vibratory force and is adjustable while in operation for varying the magnitude of said force. The exciter of this invention comprises a rotatably driven tubular exciter shaft which is confined to rotation and which has a concentric bore that opens to one of its ends and a slot that opens radially outwardly from said bore and is elongated lengthwise of the exciter shaft. A centrifugal mass means is eccentrically fixed to the exciter shaft and lengthwise spaced along it from said slot. In the bore in the exciter shaft is a control shaft that is axially slideable relative to the exciter shaft and has an end portion accessible at said one end of the exciter shaft. A transverse pin carried by the control shaft projects radially through said slot in the exciter shaft to constrain the control shaft to rotate with the exciter shaft without preventing axial adjustment of the control shaft relative to the exciter shaft. A tubular counterweight carrier relatively rotatably surrounds the exciter shaft but is confined against axial motion relative to it. The counterweight carrier has a helical groove in which a radially outer portion of said pin is slideable to translate axial adjusting motion of the control shaft into adjusting rotation of the counterweight carrier relative to the exciter shaft and to constrain the counterweight carrier to rotate with the exciter shaft in every position of axial adjustment of the control shaft. The counterweight carrier has an eccentric counterweight mass fixed thereon to be rotatably adjusted in relation to the centrifugal mass means by axial adjustment of the control shaft. Positioning means connected with said end portion of the control shaft, for varying the axial position thereof, can comprise a double-acting hydraulic cylinder-and-piston actuator that has a rotary connection with the control shaft.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

Figure 1:
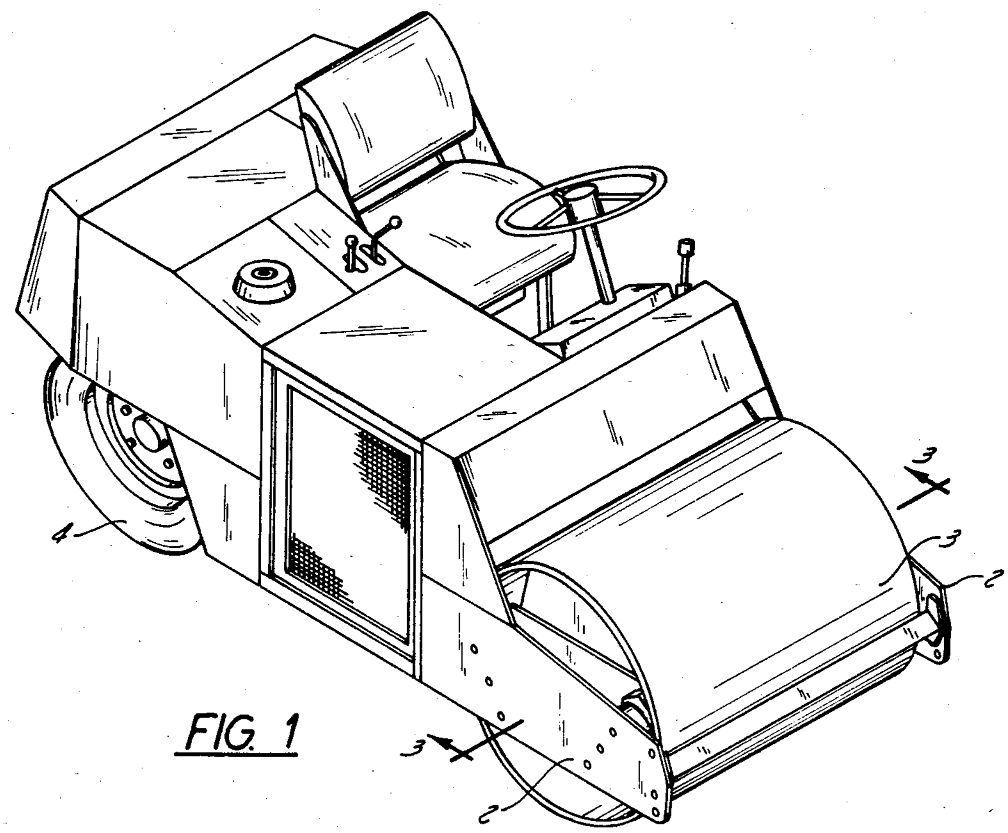
FIG. 1 is a perspective view of a roller compactor of the type for which the centrifugal exciter of this invention is adapted.
Figure 2:
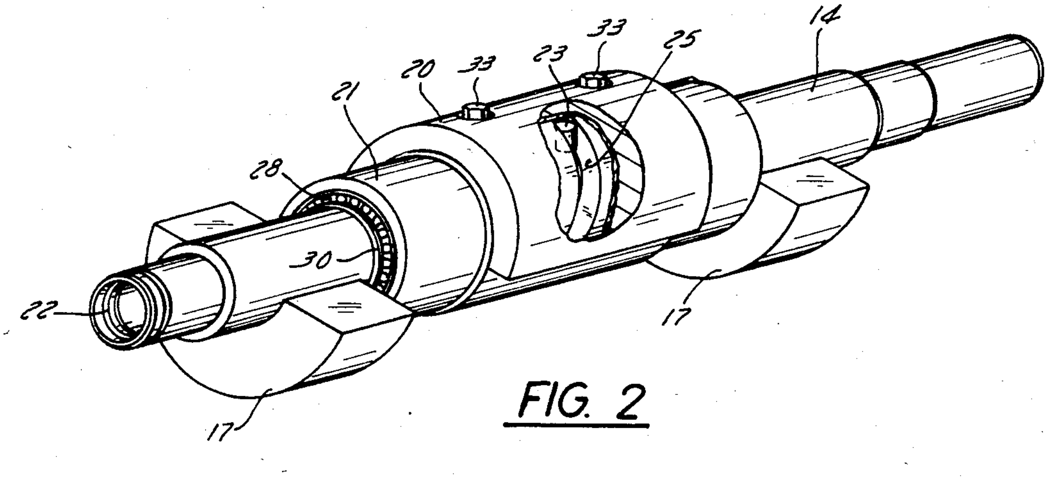
FIG. 2 is a perspective view, with portions cut away, of the main portion of the exciter itself.
Figure 3:
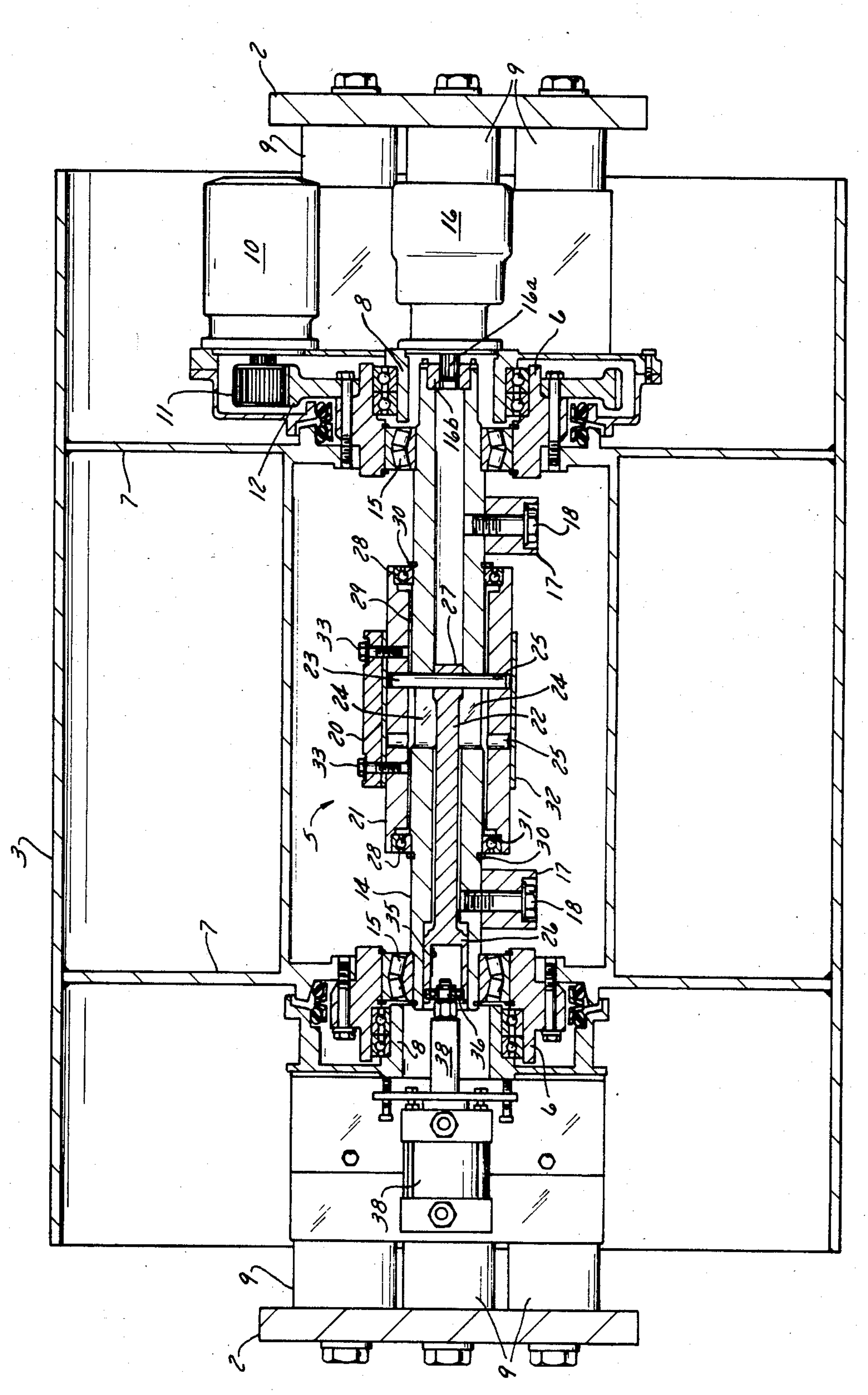
FIG. 3 is a view in longitudinal section through the drum roller and the exciter, taken on the plane of the line 3—3 in FIG. 1.
Figure 6:
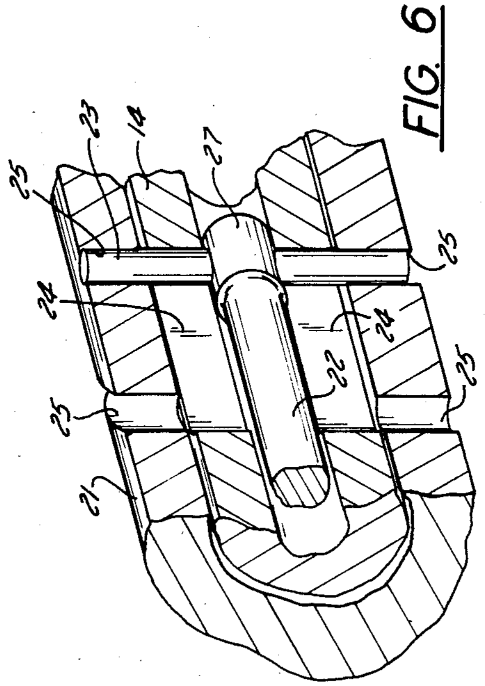
FIG. 6 is a fragmentary perspective view in section, showing the operative relationship between the exciter shaft, the control shaft and the counterweight carrier.
Figure 5:
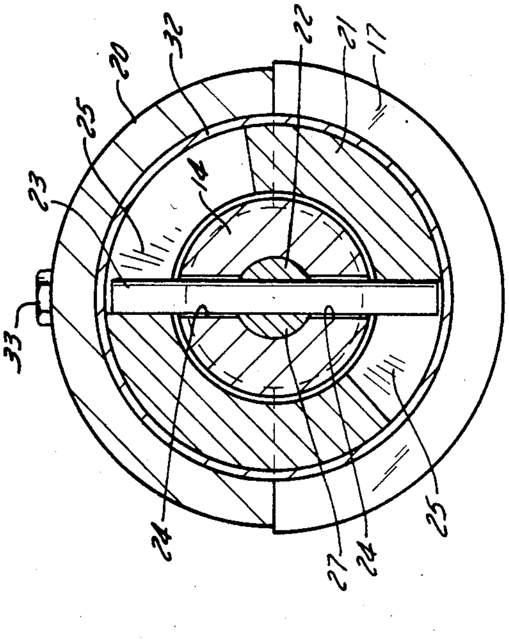
FIG. 5 is a view in cross-section through the exciter, taken on the plane of the line 5—5 in FIG. 4.
Figure 4:
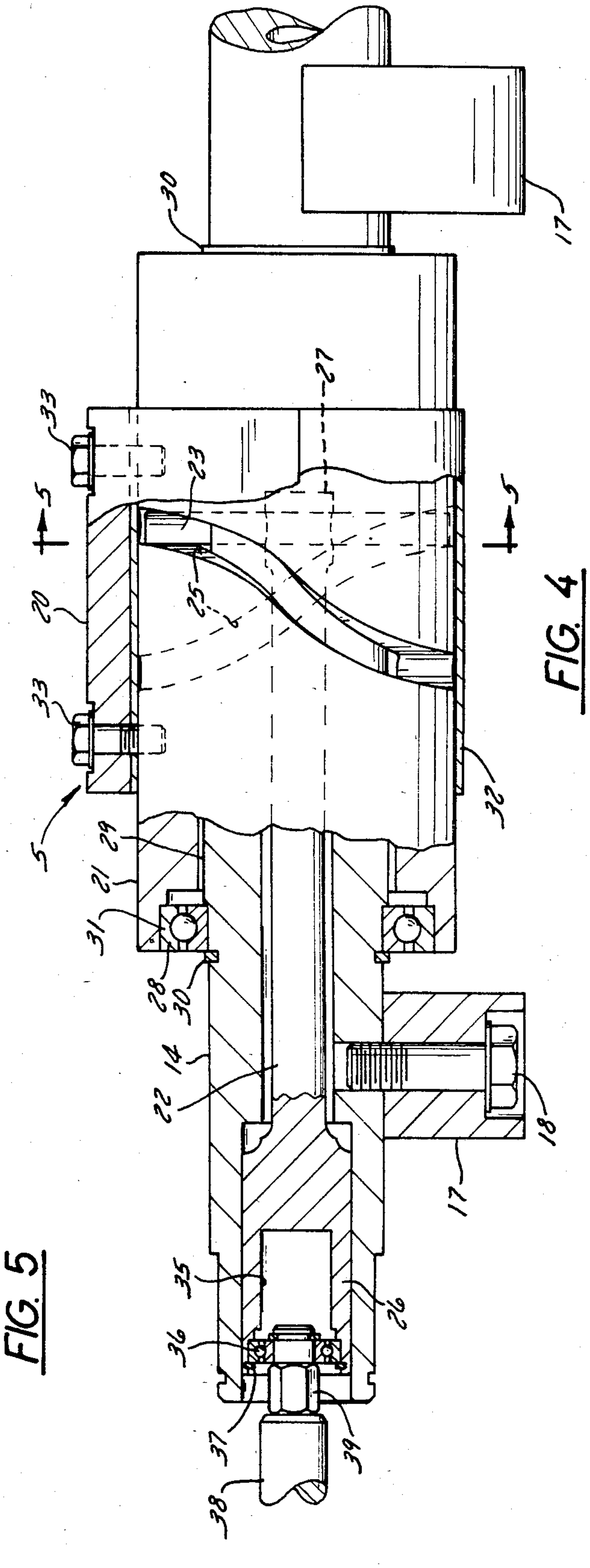
FIG. 4 is a view of the exciter on an enlarged scale, partly in side elevation and partly in longitudinal section.

FIG. 1 illustrates a typical vibratory roller compacting machine for which a centrifugal vibratory exciter of this invention is particularly suitable. Such a machine has a heavy and sturdy frame 2 which is in this case supported on a drum roller 3 at the front of the machine and a pair of steerable wheels 4 at its rear. As is generally conventional, the drum roller 3 has axially short tubular journals 6 fixed on its end walls 7 whereby it is rotatably mounted on tubular stub shafts 8 that are connected to the frame 2 by means of shock mounts 9. As is also generally conventional, the centrifugal vibratory exciter 5 of this invention is mounted in the hollow interior of the drum roller 3 and supported by the stub shafts 8, to impart vibratory force to the roller while the shock mounts 9 isolate its vibrations from the frame 2.

For propulsion of the machine the roller 3 may be rotatably driven by a hydraulic drive motor 10 that is fixed to the machine frame 2 adjacent to one end of the roller. The motor 10 is mounted eccentrically to the roller and has a driving pinion 11 that meshes with a ring gear 12 concentrically fixed on the roller.

The centrifugal exciter 5 of this invention comprises a rotatably driven tubular exciter shaft 14 that is mounted concentrically to the drum roller 3 in bearings 15 that are carried directly or indirectly by the tubular stub shafts 8 through which the roller 3 is connected with the frame. In this case, the bearings 15, which confine the tubular exciter shaft 14 to rotation, are indirectly carried by the stub shafts 8 in that those bearings 15 are mounted in an axially inner portion of the tubular journals 6 of the roller. The exciter shaft 14 is driven for its rotation by means of a hydraulic exciter motor 16 that is mounted on the frame 2, adjacent to the roller drive motor 10, with its output shaft **16*a* concentric to the exciter shaft 14 and splinedly connected to a plug or end cap 16*b*** that is concentrically fixed on the exciter shaft.

Eccentrically fixed to the exciter shaft 14 are a pair of substantially U-shaped centrifugal masses 17, one near each of its opposite ends. Each of the centrifugal masses 17 can be fastened to the exciter shaft 14 by means of a radially extending cap screw 18 that is threaded into the exciter shaft and is preferably secured by a lock washer. Since the two centrifugal masses are both at the same side of the exciter shaft 14, they centrifugally generate a vibratory force of high magnitude. They are of course spaced equal distances to opposite sides of the vertical medial plane of the drum roller 3 so that the vibratory forces which they impose upon that roller will be uniform along its length.

To a controllably variable extent the high centrifugal forces generated by the centrifugal mass means 17 are opposed and partially cancelled by an adjustable eccentric counterweight mass 20 that is carried by the exciter shaft midway between the two centrifugal masses 17. That counterweight mass 20 is fixed to a tubular counterweight carrier 21 which surrounds the medial portion of the exciter shaft 14 and is adjustingly rotatable relative to it but is constrained to rotate with the exciter shaft in any position of adjusting rotation in which it may be established. The means for adjusting the counterweight carrier 21 and for constraining it to rotate with the exciter shaft 14 comprises a control shaft 22 that is axially slideable in the concentric bore in the tubular exciter shaft and a transverse pin 23 that is carried by the control shaft 22 and projects radially through slots 24 in the exciter shaft 14 and into helical grooves 25 in the counterweight carrier 21.

Along most of its length the control shaft 22 has a diameter somewhat smaller than that of the bore in the exciter shaft 14. However, the control shaft has a concentric enlarged diameter outer end portion 26 which is slideably received in a counterbore in the exciter shaft that opens to its end opposite the exciter motor 16; and the opposite or inner end portion 27 of the control shaft, which is disposed in the medial portion of the exciter shaft, has a slightly enlarged diameter to have a close sliding fit in the main part of the exciter shaft bore. The pin 23 extends through a transverse bore in the enlarged diameter inner end portion 27 of the control shaft, and it can have a sliding fit in that bore.

Between the tubular counterweight carrier 21 and the exciter shaft 14 there are bearing rings 28 that concentrically support the counterweight carrier for rotation relative to the exciter shaft and confine it against axial motion. To provide for such axial restraint, the medial portion 29 of the exciter shaft has an enlarged outside diameter that defines a pair of axially outwardly facing circumferential shoulders, against each of which one of the bearing rings 28 is confined by means of a clip ring 30 that is received in a circumferential radially outwardly opening groove in the exciter shaft. The bearing rings 28 are in turn seated in respective counterbores 31 in the end portions of the counterweight carrier that define axially outwardly facing circumferential shoulders, against each of which the outer race of a bearing ring abuts.

The two slots 24 in the exciter shaft 14 through which the pin 23 projects are in the enlarged diameter medial portion 29 of that shaft, diametrically opposite one another, and they are elongated in the direction lengthwise of that shaft to provide for a substantial axial stroke of the control shaft 22 while preventing rotation of the control shaft relative to the exciter shaft. The opposite end portions of the pin 23 are received in the helical grooves 25 in the tubular counterweight carrier 21, each of which extends around about one-half of the circumference of the counterweight carrier. It will be apparent that as the control shaft 22 is moved axially back and forth in the exciter shaft, the end portions of the pin 23, sliding in the helical grooves 25, cooperate with those grooves to rotate the counterweight carrier 21 relative to the exciter shaft. However, the slots 24 in the exciter shaft cooperate with the pin 23 in constraining the control shaft to rotate with the exciter shaft; hence with the control shaft 22 confined in any axial position to which it may be adjusted, the pin 23, by its engagement in the helical grooves 25 in the counterweight carrier 21, constrains the latter to rotate with the exciter shaft.

To facilitate production, the helical grooves 25 are cut all the way through the tubular wall of the counterweight carrier 21, and the pin 23, as mentioned above, can have a close but slideable fit in its bore through the control shaft 22. To substantially confine the pin against endwise motion, the counterweight carrier proper is surrounded by a thin, closely fitting sleeve 32 which, in effect, closes the helical grooves by providing radially inwardly facing bottom surfaces for them. The arcuate or U-shaped counterweight mass 20 embraces the sleeve 32 and is secured to the counterweight carrier 21 by means of cap screws 33 which are threaded into it through holes in the sleeve 32, to thus fix the sleeve as well as the counterweight mass to the counterweight carrier.

In the enlarged diameter outer end portion 26 of the control shaft 22 there is a concentric outwardly opening well 35 with a mouth portion of stepwise increased diameter in which a bearing ring 36 is seated. The outer race of this bearing ring 36 is axially confined between an axially outwardly facing circumferential shoulder, defined by the enlarged diameter mouth portion of the well, and a clip ring 37 that is received in a radially inwardly opening circumferential groove in the well. The bearing ring 36 serves to transmit axial thrust in both directions to the control shaft 22 from a double-acting hydraulic cylinder 38 that is mounted on the machine frame 2 in concentric relation to the shafts 14 and 22; and at the same time the bearing ring 36 permits the control shaft 22 to rotate with the exciter shaft 14 and relative to the hydraulic cylinder 38. To these ends the inner race of the bearing ring 36 is connected with the piston rod of the hydraulic cylinder 38 by means of a suitable coaxial adapter 39.

Each of the helical grooves 25 in the counterweight carrier 21 preferably extends around at least half the circumference of the counterweight carrier 21, so that as the control shaft 22 is moved axially through its full stroke the counterweight mass 20 is rotated through 180° relative to the centrifugal masses 17. Thus, at one limit of the control shaft stroke the counterweight mass 20 will be disposed diametrically opposite the centrifugal masses 17 (180° out of phase with them) and will therefore offset or cancel their centrifugal effect to a substantial extent so that the vibratory force produced by the exciter will then have a minimum magnitude at every rotational speed of the exciter. At the other limit of the control shaft stroke the counterweight mass 20 will be on the same side of the exciter shaft as the centrifugal masses 17, to be in phase with them, and its centrifugal force will be added to theirs, so that the exciter then generates a vibratory force of maximum magnitude at every rotational speed of the exciter. In intermediate axial positions of the control shaft 22 the counterweight mass 20 will be partly out of phase with the centrifugal masses 17 and the magnitude of vibration can thus be steplessly varied from maximum to minimum in accordance with the axial position of the control shaft.

It will be obvious that the position of the control shaft 22 is remotely controllable from the operator's position on the machine by means of a control valve (not shown) that is connected between the double acting cylinder 38 and a source of pressurized hydraulic fluid on the machine. Details of the control valve and its connections with the hydraulic cylinder 38 will be familiar to those acquainted with hydraulic systems and therefore are not shown.

From the foregoing description and the accompanying drawings it will be apparent that this invention provides a centrifugal exciter for a vibratory compactor that it steplessly adjustable while in operation to provide any of a wide range of force magnitudes at any given vibration frequency, and that a compactor equipped with the exciter of this invention will therefore be extremely versatile as well as capable of operation at high efficiency on any material to be compacted.

What is claimed as the invention is:

1. A centrifugal vibratory exciter for a compacting machine that comprises a machine frame on which there are opposite coaxial and tubular stub shafts and a hollow drum roller mounted for rotation on said stub shafts, said exciter comprising a rotatably driven exciter shaft extending coaxially through said drum roller and having opposite end portions rotatably supported by said stub shafts, centrifugal mass means fixed on said exciter shaft, and an eccentric counterweight mass which is carried by said exciter shaft for normal rotation therewith but which is rotatably shiftable relative to said exciter shaft between a pair of defined positions, at one of which said counterweight mass offsets a substantial part of the centrifugal force due to said centrifugal mass means to produce a low level of vibration and at the other of which a high level of vibration is produced, said exciter being characterized by:

A. said exciter shaft
 (1) having a concentric bore that opens to one of its ends, to comprise a first tubular member, and
 (2) having a medial portion intermediate its said end portions which is of larger outside diameter than the rest of the exciter shaft and which defines a pair of axially outwardly facing circumferential shoulders;

B. said centrifugal mass means comprising a pair of substantially identical centrifugal masses spaced in axially opposite directions from said medial portion, secured eccentrically to said exciter shaft, both at the same circumferential side thereof;

C. a pair of bearing rings surrounding said exciter shaft, one axially adjacent to each of said shoulders;

D. a pair of securement elements on said exciter shaft, one for each of said bearing rings, cooperating with said shoulders to confine the bearing rings against axial displacement relative to the exciter shaft;

E. a counterweight carrier which comprises a second tubular member, said counterweight carrier
 (1) having a bore therethrough which is larger in diameter than said medial portion of the exciter shaft,
 (2) having a pair of counterbores, one opening to each of its ends, wherein said bearing rings are received to coaxially support the counterweight carrier on the exciter shaft for rotation relative thereto, said counterbores defining axially outwardly facing circumferential shoulders which cooperate with the bearing rings to confine the counterweight carrier against axial movement relative to the exciter shaft;

F. said counterweight mass being eccentrically fixed to the counterweight carrier to be axially intermediate said centrifugal masses;

G. a control shaft coaxially slidable in said bore in the exciter shaft and having an end portion accessible at said one end of the exciter shaft;

H. a pin carried by said control shaft and extending transversely therethrough, said pin having
 (1) a portion slidably received in a slot in one of said tubular members that is elongated in the direction lengthwise of the control shaft, whereby the control shaft is constrained to rotate with that one tubular member but is permitted to move lengthwise relative to it, and
 (2) another portion slidably received in a helical groove in the other of said tubular members that cooperates with said slot and the pin to translate lengthwise motion of the control shaft into rotation of the counterweight carrier relative to the exciter shaft and to constrain the counterweight carrier to rotate with the exciter shaft in every position of lengthwise motion of the control shaft; and I. positioning means connected with said end portion of the control shaft for adjustably shifting it lengthwise and holding it in positions of adjustment to which it is shifted.

2. The centrifugal vibratory exciter of claim 1, further characterized by said positioning means comprising:
 (1) a hydraulic cylinder-and-piston actuator mounted on said machine frame in concentric relation to said exciter shaft and adjacent to said one end thereof; and
 (2) bearing means connecting said control shaft with the piston of said cylinder-and-piston actuator and constraining the control shaft to move axially with said piston while providing for its rotation relative to the piston.

3. The centrifugal vibratory exciter of claim 1 wherein each of said securement elements comprises a clip ring received in a circumferential groove in the exciter shaft that is spaced axially outwardly from one of said shoulders thereon.

* * * * *